US010690156B2

(12) United States Patent
Skundrik

(10) Patent No.: US 10,690,156 B2
(45) Date of Patent: Jun. 23, 2020

(54) PRECISION POWER MOVEMENT LOCKING DEVICE

(71) Applicant: APIS COR ENGINEERING, LLC, Owings Mills, MD (US)

(72) Inventor: Viktor Skundrik, Irkutsk (RU)

(73) Assignee: APIS COR ENGINEERING, LLC, Owings Mills, MD (US)

( * ) Notice: Subject to any disclaimer, the term of this patent is extended or adjusted under 35 U.S.C. 154(b) by 105 days.

(21) Appl. No.: 15/928,402

(22) Filed: Mar. 22, 2018

(65) Prior Publication Data

US 2018/0274566 A1 Sep. 27, 2018

Related U.S. Application Data

(60) Provisional application No. 62/474,761, filed on Mar. 22, 2017.

(51) Int. Cl.

*F15B 15/26* (2006.01)
*F15B 15/14* (2006.01)
*E05B 51/02* (2006.01)
*B33Y 40/00* (2020.01)

(52) U.S. Cl.

CPC ............ *F15B 15/262* (2013.01); *E05B 51/02* (2013.01); *F15B 15/14* (2013.01); *B33Y 40/00* (2014.12)

(58) Field of Classification Search

CPC ......................... F15B 15/262; F15B 2015/268
See application file for complete search history.

(56) References Cited

U.S. PATENT DOCUMENTS

| | | | | |
|---|---|---|---|---|
| 4,534,269 A * | 8/1985 | Scerbo | F15B 15/262 | 188/67 |
| 5,490,443 A * | 2/1996 | Atsuta | F15B 15/262 | 91/44 |
| 6,009,981 A * | 1/2000 | Wolfe | B23Q 1/28 | 188/267 |
| 2004/0256779 A1* | 12/2004 | Kawakami | B23Q 3/108 | 269/309 |
| 2016/0076562 A1* | 3/2016 | Cazier | F15B 15/262 | 92/27 |
| 2019/0219076 A1* | 7/2019 | Landberg | B64C 13/40 | |

FOREIGN PATENT DOCUMENTS

WO WO-2015195029 A1 * 12/2015 .......... F15B 11/0365

* cited by examiner

*Primary Examiner* — Thomas E Lazo
*Assistant Examiner* — Matthew Wiblin
(74) *Attorney, Agent, or Firm* — Nadya Reingand; Yan Hankin

(57) ABSTRACT

A locking device for fixing a sliding element is disclosed. The locking device employs a cylindrical membrane surrounding a sliding rod element, where both the membrane and the rod are enclosed within a housing. The rod slides freely relative to the membrane until an oil pressure is increased within the oil chamber, the oil chamber being enclosed by the membrane. The pressure within the oil chamber causes the membrane to temporarily deform and press against the rod, thus fixing the rod in a particular position. When the oil pressure is lowered below a threshold value, the membrane returns to its original shape and the rod continues to freely slide within the apparatus. The membrane is very thin yet capable of repeatable use. The membrane spans continuously along the entire portion of the rod within the fixing region of the device, thus creating a precise and powerful fixing means.

19 Claims, 3 Drawing Sheets

PRECISION POWER MOVEMENT LOCKING DEVICE

CROSS-REFERENCE TO RELATED APPLICATIONS

This patent application claims priority to, and incorporates fully by reference, U.S. Provisional Patent Application Ser. No. 62/474,761, filed Mar. 22, 2017.

FIELD OF THE INVENTION

The present invention relates to locking mechanisms for hydraulic or pneumatic actuators used to exert forces through a rod when hydraulic or pneumatic pressure is applied to the actuator. More specifically, the invention is a locking device for fixing the rod of a hydraulic or pneumatic actuator of a 3-D printing device in a desired position.

BACKGROUND OF THE INVENTION

Prior art locking devices comprising deformable membranes require pads or auxiliary mechanisms located between the membrane and the rod of the device. Such pads or auxiliary mechanisms are perforated, meaning that they do not extend along the entire length of the rod. Instead, these pads are separated in space, which causes the force of the membrane to be transferred indirectly and to only parts of the rod. Furthermore, such pads/auxiliary mechanisms comprise rough edges which are not flush with the rod or the membrane of the device, causing both elements to become damaged over a short amount of time. Additionally, such pads have mandatory clearances for installation.

Therefore, prior art locking devices place unnecessary strain on the rod and membrane elements of the locking mechanism, causing deterioration and/or permanent deformation. Some prior art devices contain additional unnecessary elements which do not allow for a flush and direct contact between the rod and membrane elements. Other prior devices do not allow for precise locking capability at any given length of the device, providing instead a capability to lock at a first position and a second (end) position.

The present invention addresses the particular disadvantages discussed above.

SUMMARY OF THE INVENTION

The present invention discloses a locking device, the locking device comprising a housing, a rod, said rod being inserted into said housing, said rod sliding relative to said housing, an oil chamber, said oil chamber containing a hydraulic oil, said oil chamber being connected to a hydraulic port for adjusting an oil pressure within said oil chamber, and a cylindrical membrane, said membrane being located along an inner portion of the housing between said oil chamber and said rod, wherein in an original position of said membrane a space exists between said membrane and said rod such that said rod moves freely with respect to said membrane and said housing, said membrane being deformable when said oil pressure is increased, said membrane making a flush and continuous contact with the rod when said membrane is deformed thus causing a fixation of said rod in a desired position, said membrane returning to the original position when said oil pressure is decreased.

BRIEF DESCRIPTION OF THE DRAWINGS

FIG. 5 further shows greater detail of the shape of the membrane.

DETAILED DESCRIPTION OF THE PREFERRED EMBODIMENT

Figure 1:
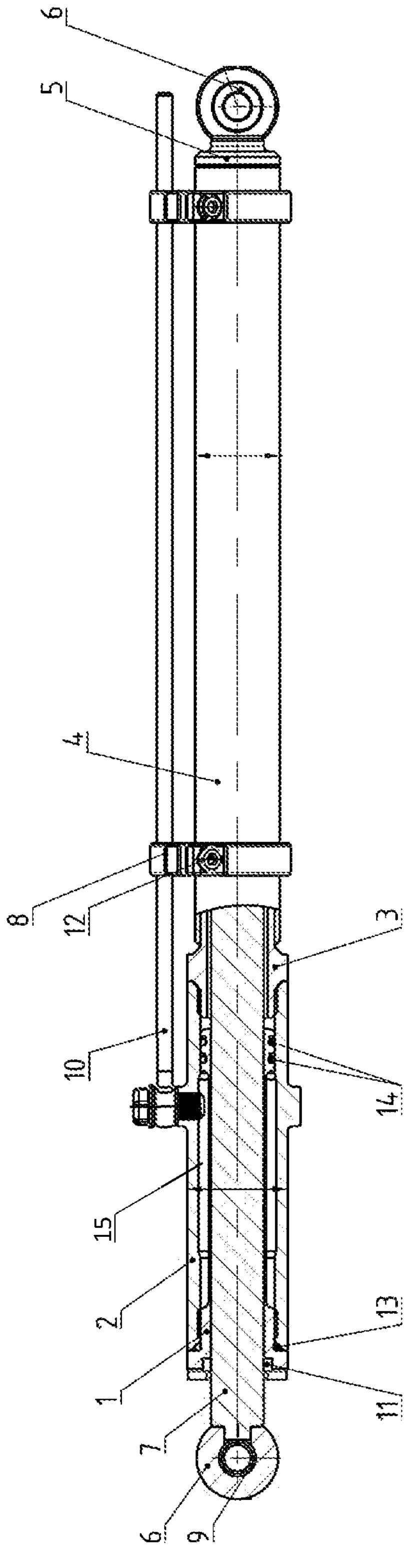
FIG. 1 shows a locking device according to the present invention.

The present invention improves upon 3-D printing devices and systems, and particularly upon the lifting mechanism associated with such printing devices and systems. The present invention is designed to control the movement of extendable diagonal sections of the lift mechanisms (constant diameter and repeatable sections in between cylinders, connecting the cylinders to one another for additional support). The present invention is also designed to control the lifting cylindrical members of the lift mechanisms (rods of pneumatic and/or hydraulic cylinders). Both of these examples are non-limiting, as the locking device may be implemented with any structure or mechanism which benefits from precise fixation of expanding or contracting parts.

In general, a rod (stem) of the locking device has a minimal clearance from the membrane and moves freely relative to the membrane. The membrane, which is cylindrical, envelopes the rod of the locking device. The membrane's thickness is chosen such that when applying pressure through a hydraulic port, a lock is enforced such that the membrane clamps the rod and prohibits further movement of the rod via a torsional stiffness. Such lock occurs via a linear strain without a plastic deformation of the membrane. Linear strain is achieved by changing the oil pressure within the oil chamber, which in turn temporarily changes the shape of the membrane, which in turn presses against the rod and causes a locking/fixation of the rod. Linear strain allows for the membrane to change its shape without becoming permanently deformed in its new shape, such that the membrane returns to its original shape and size when the oil pressure is lowered. Plastic deformation refers to the situation where there is too much pressure on the membrane and the membrane is not able to return to its original shape, which would cause further mechanical stress on the rod, thus damaging the rod. For usefulness and repetition of fixation, plastic deformation is to be avoided. By achieving linear strain without reaching plastic deformation, theoretically, the fixation may occur an unlimited number of times. The membrane's length relative to the length of the rod is also configured such that a required fixation force at a given pressure is ensured. Thus, when a fluid or pneumatic pressure is applied to the membrane, the membrane is deformed and pressed against the rod, prohibiting movement of the rod. Then, when the pressure is lowered, the membrane returns to its original shape and releases the rod, allowing the rod to move once again. This increase and decrease of pressure is repeated, causing the rod to be fixed at any length or position and thereafter released so that the rod may slide to change its length. During fixation, contact between the rod and membrane is flush and unbroken along the entire portion of the rod within the length of the membrane; thus, fixation occurs smoothly along the entire length of the rod without destroying the rod via openings or sharp, rough, or perforated edges.

Referring to FIG. 1, the main elements of the locking device comprise the stem (or rod) 7, the cylindrical membrane (or cartridge) 1, the housing (or shell) 2, and an oil chamber 15, the oil chamber being located between the membrane 1 and the housing 2. Additional elements comprise a sleeve with threading 3, a tube 4 which surrounds the stem (or rod) 7, a cover 5 which attaches to one end of the tube 4, two endpieces 6 (one being connected to the cover 5 at one end of the device, the other being connected to the stem (or rod) 7 at the opposite end of the device), a hose attachment (or hydraulic port) 8 where the hose from a hydraulic pump may be attached to the device, an insert 9 preferably comprising brass and connected to that endpiece 6 which is connected to the stem 7. Also, optionally included in the device is a fitting band 10 for supplying oil, a wiping/cleaning element (rod wiper) 11 for cleaning the rod 7, removing grease, and protecting the inner elements of the housing 2, and one or more sealing o-rings 13, 14 located at the front end and the back end of the oil chamber 15.

Figure 4:
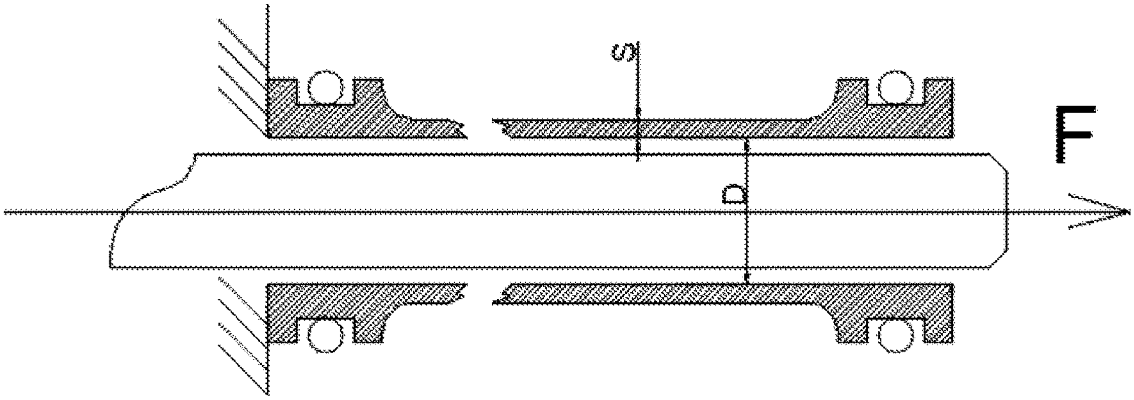
FIG. 4 shows an expanded diagram of the mechanism of the locking device and measurements as they relate to Equations 1-3.
Figure 5:
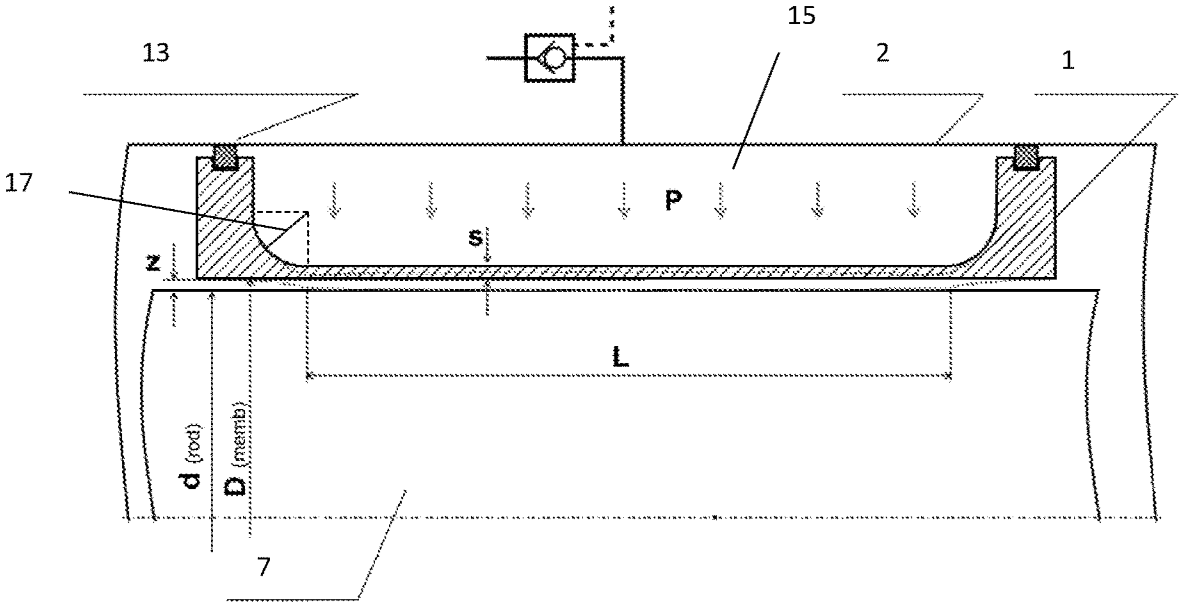
FIG. 5 shows an expanded diagram of the mechanism of the locking device and measurements as they relate to Equations 1-3.

A specific feature of the membrane 1, which is more clearly illustrated in FIGS. 4-5, is its U-shape, allowing for the oil chamber 15 to be positioned and hermetically sealed within the membrane 1 via the placement of sealing o-rings 13, 14. The portion of the membrane that presses against the rod is thin, however the outer ends of the membrane become thicker, following a U-shape. The curvature radius 17 which forms this U-shape of the membrane is preferably less than the thickness of the portion of the membrane which contacts the rod (e.g., curvature radius is less than 0.8 mm for aluminum, or less than 0.3-0.4 mm for steel).

In general, it is recommended to determine the minimum membrane thickness ($S_{min}$) in order to ensure that the membrane is strong enough based on the required locking force. The minimum thickness, $S_{min}$, is expressed via the following relationship (see also FIG. 4):

$$S_{min} \leq ((C*F)/(\pi*D*\delta_{0.2})), \quad \text{(Equation 1), where:}$$

C is a coefficient between 1.5 and 1.8,
F=shearing force,
$\delta_{0.2}$=yield stress, and
D=rod diameter.

Preferably, the length of the membrane 1 is between 80 and 100 mm. The membrane may be comprised of any metal, for example, steel or aluminum.

Preferably, the thickness of the membrane 1 is at least about 0.8 mm (if the membrane is made of aluminum alloys) or at least about 0.3-0.4 mm (if the membrane is made of steel). The following Table (Table 1) provides further preferred values of $S_{min}$, based on rod diameter:

TABLE 1

Preferred Membrane Thicknesses.

| Rod diameter (mm) | Recommended membrane thickness (mm) | |
|---|---|---|
| | Steels | Aluminum alloys |
| 15-25 | 0.3-1.5 | 0.8-2 |
| 25-35 | 0.8-2 | 1-3 |
| 35-40 | 1.5-3 | 1.5-4 |
| 40 or greater | 1.5 or greater | 1.5 or greater |

Preferably, the diameter of the rod is about 20 mm. The recommended engineering tolerance of the rod fit into the membrane is H7/h6. Alternatively, the engineering tolerance may be H8/h6, when requirements for operating forces and lifespan are lower. The rod is preferably comprised of steel, with a surface hardness of at least 40 HRC, and with a surface roughness of at least $R_a$=0.1.

The following table (Table 2) shows varying preferred loads, or braking force, based on rod diameter:

TABLE 2

Preferred Loads.

| Rod diameter (mm) | Braking force (N) |
|---|---|
| 15 | Up to 5,000 |
| 20 | Up to 9,000 |
| 30 | Up to 60,000 |
| 40 | Up to 200,000 |
| 50 | Up to 400,000 |
| 100 | Up to ~700,000 |

In general, the braking force begins at a certain oil pressure, $\rho_{initial}$, defined by the following relationship (see also FIG. 5):

$$\rho_{initial}=4ESZ/D^2, \quad \text{(Equation 2) where}$$

E=modulus of elasticity of the membrane material,
S=membrane thickness,
Z=gap/distance between the membrane and the rod, and
D=rod diameter.

Preferably, the distance between the rod and the membrane, when the membrane is not pressing on the rod, is about 0.01 mm. When the membrane is pressed down onto the rod, the distance between the membrane and the housing/shell is preferably 1 mm.

The pressure is applied through the hydraulic port via a hydraulic pump. The pressure is maintained via any known pressure-locking mechanism. The pressure supplied may be from zero to 200 bar. At zero to 60 bar pressure, the rod is freely moveable, as the membrane does not contact the rod. As pressure is increased above 60 bar, the rigidity of the device increases because the membrane is temporarily deformed to contact the rod. At 200 bar pressure, plastic deformation may occur, which is not desired. The preferred working pressure range for fixing the rod via linear strain of the membrane is 160 to 180 bar.

The preferred pressure parameters create a braking force of 2-2.5 tons. In general, the maximum braking force ($F_{max}$) may be approximately calculated by the following relationship (see FIGS. 4-5):

$$F_{max}=X*\pi*D*L*(\rho_{max}-\rho_{initial}), \quad \text{(Equation 3), where}$$

X is a coefficient between 0.1 and 0.2,
D=rod diameter,
L=length of the membrane which contacts the rod (i.e., length of membrane between curved portions of the membrane),
$\rho_{max}$=maximum pressure, and
$\rho_{initial}$=initial pressure.

Deformation of the membrane occurs due to the oil pressure on the membrane wall. The deformation from oil pressure allows for the rod to be fixed in a desired position as the membrane presses against the rod. The oil used is hydraulic oil.

The membrane 1 is a hermetically sealed membrane. The hermetic sealing is achieved via sealing o-rings 13, 14 positioned at the front end of the oil chamber and at the back end of the oil chamber. The o-rings keep the oil within the oil chamber and the housing. The o-rings also help to maintain the pressure of the oil within the device. The o-rings have a thickness of approximately 2.5 mm. The o-rings have a size of approximately 24-29 mm in diameter (from one side to the other side). The o-rings may comprise silicon, rubber, or polyurethane.

Furthermore, there are no incisions on the membrane and the membrane fits the stem without any padding or auxiliary elements. Prior art devices comprise pads or auxiliary elements which do not extend flush along the full length of the rod. Instead, prior art pads and auxiliary elements, which are required for locking/fixing the rod, comprise perforations and/or rough edges which deform the membrane and the rod. The features of the membrane of the present invention in contrast allow for extremely smooth contact between the membrane and the rod. This in turn allows for repeatable and precise movement with the ability for repeatable fixation at a very precise length, a property which is critical for 3-D printing devices which comprise the locking device of the present invention. Without such consistent precision, a 3-D printing device will not function as professionally desired, since even a small deviation in distance creates a significant difference in the end product.

Embodiment 1: Expanding and Contracting Connecting Elements

Figure 2:
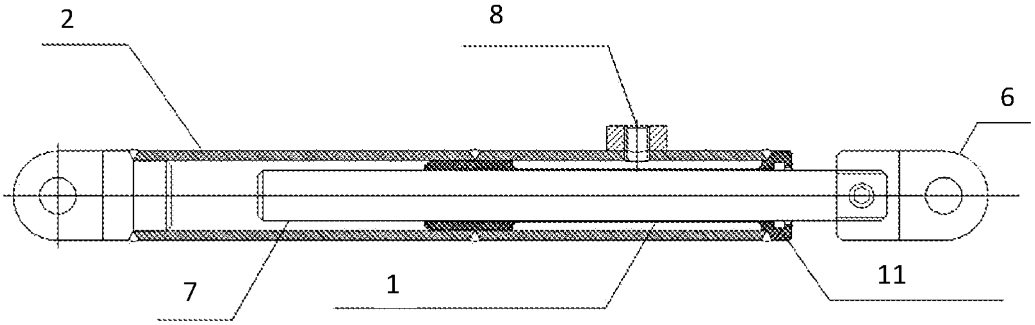
FIG. 2 shows a first exemplary application of the locking device of the present invention.

FIG. 2 shows an exemplary embodiment of the present invention wherein the device is expanded and contracted via external mechanisms attached to the rod lugs (also referred to as end pieces) on each side of the device. The external mechanisms cause the device to either expand or contract. When a sufficient pressure is applied on the membrane, the rod becomes fixed and the structure (i.e., the device and the external mechanisms) acquires a precise torsional stiffness. When the pressure is lowered such that the membrane returns to a position where it is not in contact with the rod, the device is once again allowed to expand or contract via sliding of the rod relative to the housing and membrane.

Embodiment 2: Hydraulic or Pneumatic Cylinders with Extendable Locking Rod

Figure 3:
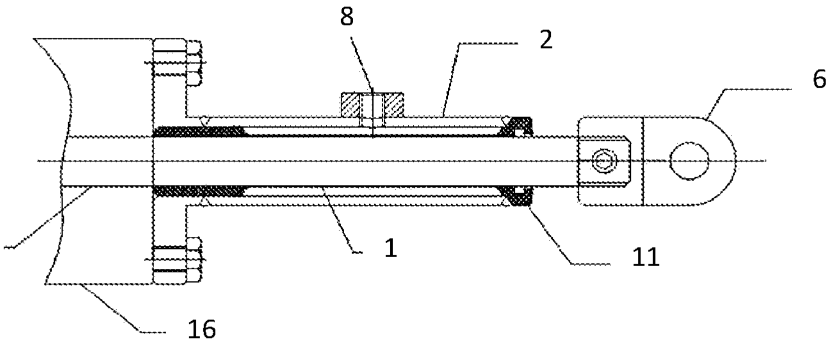
FIG. 3 shows a second exemplary application of the locking device of the present invention.

FIG. 3 shows an exemplary application of the present invention for fixing the rod of a hydraulic cylinder or pneumatic cylinder. A rod is insertable into a larger external device 16, e.g., a hydraulic or pneumatic cylinder. The external end of the rod is connected to an external mechanism which moves the rod further into the cylinder or out of the cylinder. When a sufficient pressure is applied on the membrane of the device, the rod becomes fixed and the structure (i.e., the locking device and the cylinder) acquires a precise torsional stiffness. When the pressure is lowered such that the membrane returns to a position where it is not in contact with the rod, the rod is once again allowed to slide relative to the housing and membrane of the device and relative to the stationary cylinder. This embodiment can be used in cases where it is necessary to firmly fix the rod of a cylinder, for example, when the hydraulic cylinder or the pneumatic cylinder is under load and it is necessary to fix it rigidly in a given position.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A locking device, comprising:

a housing, a rod, said rod being inserted into said housing, said rod sliding relative to said housing, an oil chamber, said oil chamber containing a hydraulic oil, said oil chamber being connected to a hydraulic port for adjusting an oil pressure within said oil chamber, and a cylindrical membrane, said membrane being located along an inner portion of the housing between said oil chamber and said rod, wherein in an original position of said membrane a space exists between said membrane and said rod such that said rod moves freely with respect to said membrane and said housing, said membrane being deformable when said oil pressure is increased, said membrane making a flush and continuous contact with the rod when said membrane is deformed thus causing a fixation of said rod in a desired position, said membrane returning to the original position when said oil pressure is decreased, wherein the membrane has a minimum thickness, said minimum thickness being determined by the formula, $S_{min} \geq ((C*F)/(\pi*D*\delta_{0.2}))$, wherein C is a coefficient between 1.5 and 1.8, F is a shearing force, $\delta_{0.2}$ is a yield stress, and D is a rod diameter.

2. The locking device of claim 1, further comprising:

one or more sealing o-rings located at each end of the oil chamber, said one or more sealing o-rings at each end of the oil chamber forming a hermetic seal.

3. The locking device of claim 2, wherein said one or more sealing o-rings have a thickness of 2.5 mm.

4. The locking device of claim 1, further comprising a rod wiper.

5. The locking device of claim 1, wherein the membrane is U-shaped.

6. The locking device of claim 5, wherein outer ends of the U-shaped membrane are thicker than an inner portion of the U-shaped membrane, wherein only said inner portion of the U-shaped membrane makes contact with the rod when the membrane is deformed.

7. The locking device of claim 5, wherein a curvature radius which forms the U-shaped membrane is less than a thickness of a portion of the membrane which contacts the rod during fixation.

8. The locking device of claim 1, further comprising two endpieces, the endpieces being attached to opposite ends of the device, said endpieces being further attachable to external mechanisms.

9. The locking device of claim 1, further comprising one endpiece attached to an outer end of the rod, said outer end of the rod forming a first end of the device, wherein an opposite end of the device is attached to a pneumatic or hydraulic cylinder.

10. The locking device of claim 1, wherein the membrane has a length between 80 mm and 100 mm.

11. The locking device of claim 1, wherein the membrane is made of aluminum and has a thickness of at least 0.8 mm.

12. The locking device of claim 1, wherein the membrane is made of steel and has a thickness of at least 0.3 mm.

13. The locking device of claim 1, wherein the device has a braking force of up to 9,000 Newtons.

14. The locking device of claim 1, wherein, in the original position, a distance between said rod and said membrane is 0.01 mm.

15. The locking device of claim 1, wherein a minimum oil pressure required to deform the membrane is calculated as $4ESZ/D^2$, wherein E is a modulus of elasticity of the membrane material, S is a membrane thickness, Z is a distance between the membrane and the rod, and D is a rod diameter, the minimum oil pressure required acting as a threshold value indicating when plastic deformation will occur.

16. The locking device of claim 1, said locking device being a part of a 3-D printing system.

17. The locking device of claim 1, wherein said oil pressure is never greater than 200 bar.

18. The locking device of claim 1, wherein said oil pressure is between 160 bar and 180 bar during fixation, and wherein said oil pressure is below 60 bar during a free movement of the rod.

19. The locking device of claim 1, wherein a rod diameter is 20 mm.

* * * * *